United States Patent
Ray et al.

[11] Patent Number: 6,144,030
[45] Date of Patent: *Nov. 7, 2000

[54] ADVANCED SMALL PIXEL HIGH FILL FACTOR UNCOOLED FOCAL PLANE ARRAY

[75] Inventors: Michael Ray; Michael D. Jack, both of Goleta; William A. Radford; Daniel F. Murphy, both of Santa Barbara, all of Calif.

[73] Assignee: Raytheon Company, Lexington, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,143

[22] Filed: Oct. 28, 1997

[51] Int. Cl.$^7$ ........................................... G01J 5/20
[52] U.S. Cl. ........................................... 250/338.4
[58] Field of Search ........................................... 250/338.4

[56] References Cited

U.S. PATENT DOCUMENTS

| | | |
|---|---|---|
| 5,286,976 | 2/1994 | Cole . |
| 5,367,167 | 11/1994 | Keenan ........................ 250/338.4 |
| 5,401,968 | 3/1995 | Cox . |
| 5,449,910 | 9/1995 | Wood et al. . |
| 5,450,053 | 9/1995 | Wood . |
| 5,534,111 | 7/1996 | Hocker et al. . |
| 5,602,393 | 2/1997 | Gerard . |
| 5,627,112 | 5/1997 | Tennant et al. . |
| 5,688,699 | 11/1997 | Cunningham et al. . |
| 5,760,398 | 6/1998 | Blackwell et al. . |
| 5,789,753 | 8/1998 | Gooch et al. ........................ 250/349 |
| 5,939,971 | 8/1999 | Yong . |

OTHER PUBLICATIONS

DARPA/ETO 1996 Optoelectronics Program Reviews: Oct. 7–10, Orlando, Florida, pp. 47 and 48.

*Primary Examiner*—Constantine Hannaher
*Attorney, Agent, or Firm*—William C. Schubert; Glenn H. Lenzen, Jr.

[57] ABSTRACT

A microbolometer detector element (10) for a focal plane array is provided including an optically absorptive material structure (12) characterized by an electrical resistivity that varies as a function of its temperature coupled in spaced relation to a thermal isolation structure (20). The thermal isolation structure (20) is coupled in spaced relation to a sensor (34) connected to the optically absorptive material structure (12) for sensing the absorptive structure's (12) electrical resistivity. The thermal isolation structure (20) facilitates very high fill factors even when the pixel size is shrunk below the baseline fifty micron size. The thickness of the optically absorptive material structure (12) and the thermal isolation structure (20) can be independently controlled since the thermal isolation structure (20) is disposed in spaced relation under the absorptive material structure (12). The thermal isolation structure (20) can be made several times longer than prior art designs to increase the thermal isolation of the optically absorptive material structure (12) and to increase pixel responsivity. The thermal isolation structure (20) may include a planar member (26) for reflecting incident optical radiation not absorbed by the absorptive material (12) back to the absorptive material (12). In a preferred embodiment of the present invention, the absorptive structure (12) is a polycrystalline semiconductive layer supported above the thermal isolation structure (20) by downwardly projecting leg members (18). The thermal isolation structure (20) also includes downwardly projecting leg members (28) for supporting it in spaced relation above a silicon substrate surface (30) overlying an integrated readout circuit (34).

19 Claims, 4 Drawing Sheets

ADVANCED SMALL PIXEL HIGH FILL FACTOR UNCOOLED FOCAL PLANE ARRAY

BACKGROUND OF THE INVENTION

1. Technical Field

The present invention generally relates to detector elements for focal plane arrays, and more particularly, to a microbolometer detector element having a discrete thermally isolating structure for yielding high fill factor.

2. Discussion

Microminiature bolometers (microbolometers) such as those described in U.S. Pat. No. 5,602,393, entitled "MICROBOLOMETER DETECTOR ELEMENT WITH ENHANCED SENSITIVITY", issued Feb. 11, 1997, to Henry M. Gerard and in U.S. Pat. No. 5,286,976, entitled "MICROSTRUCTURE DESIGNED FOR HIGH IR SENSITIVITY", issued Feb. 15, 1994, to Barrett E. Cole, are used as detector pixel elements in two-dimensional IR imaging arrays. Two-dimensional detector arrays are commonly used in optical sensors to convert an observed scene into an electronic image for processing and displaying.

A microbolometer generally consists of a polycrystalline semiconductor whose electrical resistivity varies as a function of its temperature. The semiconductor layer material is chosen so that it absorbs optical radiation over a design wavelength range, which is generally in the IR region of the spectrum. The semiconductor layer is fabricated on a silicon substrate, which also contains integrated readout circuitry for monitoring the layer's resistivity. An array of microbolometers may be fabricated on a single substrate to create a two-dimensional imaging array.

In operation, incident IR radiation is absorbed by the semiconductor layer, causing a change in the layer's temperature. The temperature change causes a corresponding change in the layer's resistivity, which is monitored by the readout circuitry. The ultimate signal-to-noise ratio of the microbolometer is a function of sensor thermal mass and thermal isolation from supporting structure.

Related art microbolometers utilize a continuous semiconductor absorptive layer deposited on a dielectric "bridge" structure that has been fabricated on the silicon substrate. The bridge structure supports the layer so that it is spaced away from the silicon substrate surface. To accomplish this, conventional, uncooled microbolometers use a single sacrificial layer between the semiconductor layer and the silicon substrate during manufacturing. When the sacrificial layer is removed, the isolation support structure and the semiconductor absorptive layer are located in the same plane.

However, the current trend in microbolometer technology is towards larger formats and smaller pixels. When the pitch of the pixel is reduced for use in larger formats and for higher spacial resolution, a finite support leg length is still required in order to maintain adequate thermal isolation for responsivity performance. As such, the percentage of area that the support structure occupies increases as the pixel size decreases. This results in the absorptive area becoming smaller and smaller which reduces the fill factor and sensitivity and leads to a corresponding decrease in performance.

Therefore, it would be desirable to provide a microbolometer having a higher ratio of active detector area to total area of the pixel unit cell comprising the active detector area (fill factor) than according to the prior art. More particularly, it would be desirable to provide a microbolometer having a discrete, independently controllable, thermal isolation structure for supporting the semiconductor absorptive layer while providing an enhanced fill factor. Additionally, it would be desirable to provide a microbolometer having a thermal isolation structure which also serves as a reflective layer for reflecting incident optical radiation not absorbed by the semiconductor absorptive layer back to the semiconductor absorptive layer.

SUMMARY OF THE INVENTION

The above and other objects are provided by a microbolometer detector element for a focal plane array including an optically absorptive material structure characterized by an electrical resistivity that varies as a function of its temperature coupled in spaced relation to a thermal isolation structure. The thermal isolation structure is coupled in spaced relation to a sensor connected to the optically absorptive material structure for sensing the absorptive structure's electrical resistivity.

The thermal isolation structure facilitates very high fill factors even when the pixel size is shrunk below the baseline fifty (50) micron size. The thickness of the optically absorptive material structure and the thermal isolation structure can be independently controlled since the thermal isolation structure is discretely disposed in spaced relation under the absorptive layer. The thermal isolation structure can be made several times longer than prior art designs to increase the thermal isolation of the optically absorptive material structure and to increase pixel responsivity. The thermal isolation structure may include a planar member for reflecting incident optical radiation not absorbed by the absorptive material back to the absorptive material.

In a preferred embodiment of the present invention, the absorptive structure includes a polycrystalline semiconductive layer supported above the discrete thermal isolation structure by downwardly projecting leg members. The thermal isolation structure also includes downwardly projecting leg members for supporting it in spaced relation above a silicon substrate surface overlying an integrated readout circuit.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a microbolometer detector element having a very high fill factor. The microbolometer employs a double sacrificial layer during manufacturing that places a discrete thermal isolation structure in spaced relation under an optically absorptive material structure. The thermal isolation structure is also coupled in spaced relation to a sensor connected to the absorptive material structure to sense the absorptive structure's electrical resistivity. Since the characteristic dimensions of the optically absorptive material structure and the thermal isolation structure can be controlled independently, thermal isolation of the absorptive structure is enhanced. The present invention is particularly useful in IR imaging arrays, with each microbolometer detector element used as a single image pixel. In practice, an array of microbolometers (pixels) may be fabricated on a readout integrated circuit. As an example, each microbolometer may cover an area of approximately fifty (50) microns on a side.

Figure 1:
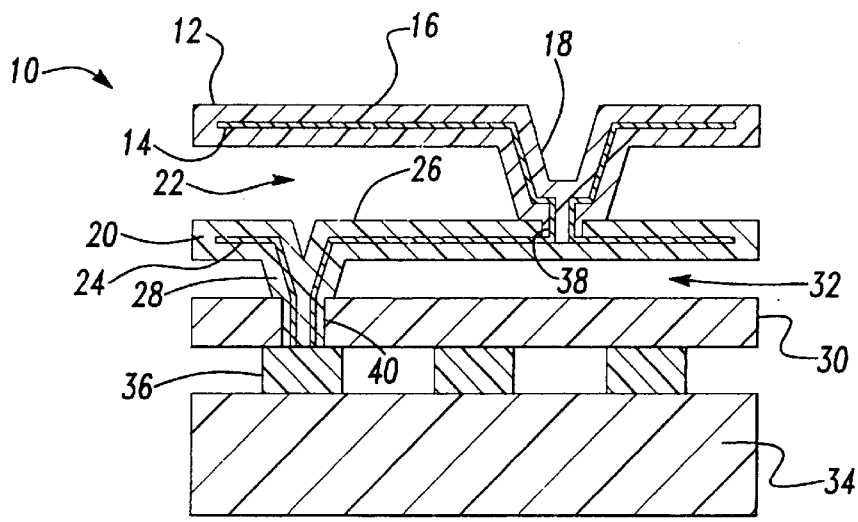
FIG. 1 is a schematic illustration in cross-section depicting a microbolometer detector element in accordance with the present invention.

Turning now to the drawing figures, a microbolometer detector element 10 is shown in FIG. 1. The bolometer 10 includes an optically absorptive material structure 12 having an electrical resistance that varies as a function of its temperature. Embedded within the absorptive structure 12 is a metal semiconductor strip 14. Vanadium oxide ($VO_x$) is the preferred material for the semiconductive strip 14 although titanium oxide or any other material that has the required electrical resistance properties may be used. The first semiconductive strip 14 is covered by an optically transmissive dielectric layer, preferably a silicon nitride (SiN) layer, to absorb incident radiation in a predetermined region. The silicon nitride also adds strength to the absorptive structure 12 and provides mechanical protection.

The absorption of incident optical radiation by the silicon nitride layer causes its temperature to change which causes a change in the temperature of the semiconductive strip 14, which in turn changes its electrical resistivity. Since the vanadium oxide has a high thermal coefficient of resistance, its electrical resistance value changes significantly with very small changes in temperature. Accordingly, very good thermal isolation is required for good detector responsivity.

The absorptive structure 12 includes a planar surface 16 and downwardly projecting leg members 18. The leg members 18 support the planar surface 16 in spaced relation above a thermally isolating structure 20. As such, an optical cavity 22 is formed between the absorptive structure 12 and the thermally isolating structure 20.

The optical cavity 22 is preferably fabricated such that the space between the absorptive structure 12 and the thermally isolating structure 20 is equal to one quarter of the design wavelength. The spacing may be subsequently adjusted to tune the absorption and reflection characteristics of the detector element to define a resonant cavity for maximizing the absorption at the absorptive structure 12. Preferably, the planar surface 16 is about 0.5 microns thick.

Embedded within the thermally isolating structure 20 is a metal conductive strip 24. Nichrome is the preferred material for the conductive strip 24, although any other material that has the required electrical resistance properties may be used. Silicon nitride preferably constitutes the remainder of the thermally isolating structure 20 since its thermal conductivity is low. The semiconductive strip 14 extends through the silicon nitride layer and contacts the underlying conductive strip 24.

The thermally isolating structure 20 includes a planar member 26 and downwardly projecting leg members 28. The leg members 28 support the planar member 26 in spaced relation above a dielectric layer 30. As such, a thermal cavity 32 is formed between the thermally isolating structure 20 and the dielectric layer 30. The thermal cavity 32 is preferably fabricated such that the space between the thermally isolating structure 20 and the dielectric layer 30 is equal to 1–2 microns. As described more fully below, the leg members 28 may advantageously be formed independently of the absorptive structure 12. This enables the thermal properties of the microbolometer 10 to be controlled to enhance its responsivity. The dielectric layer 30 is deposited on integrated readout circuitry 34. Silicon dioxide ($SiO_2$) is the preferred material for the dielectric layer 30 although other materials that have the required insulative properties may be used. The dielectric layer 30 is a passivation overglass commonly applied to readout circuitry 34. Metal pads 36 provide electrical connection between the conductive strip 24 and readout circuitry 34. Aluminum (Al) is the preferred material for the metal pads 36. The integrated readout circuitry 34 monitors the changes in electrical resistivity to determine the amount of radiation incident on the structure.

It should be noted that the leg members 18 of the absorptive structure 12 and the leg members 28 of the thermally isolating structure 20 have a non-uniform cross-sectional dimension. That is, the cross-sectional dimension of the leg members 18 decreases from the absorptive structure 12 towards the thermally isolating structure 20. Likewise, the cross-sectional dimension of the leg members 28 decreases from the thermally isolating structure 20 to the dielectric layer 30. In this way, a "sloped" leg structure is provided for each of the absorptive structure 12 and the thermally isolating structure 20.

It should also be noted that a recess 38 is formed in an upper surface of the silicon nitride material of the thermally isolating structure 20. The recess 38 provides electrical access to the conductive strip 24 therein. Therefore, the semiconductive strip 14 may be electrically connected to the conductive strip 24 through the recess 38. Similarly, the dielectric layer 30 includes a first via 40 for providing electrical access to the metal pads 36 and readout circuitry 34. Therefore, the conductive strip 24 may extend through the silicon nitride and electrically contact the underlying metal pads 36 and readout circuitry 34.

Figure 2:
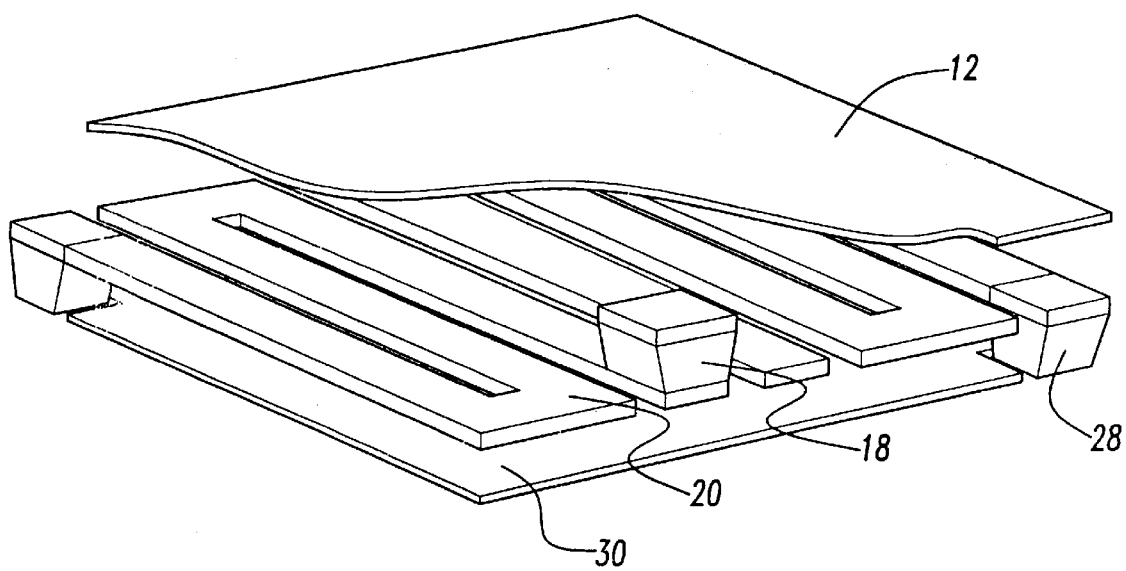
FIG. 2 is a schematic perspective partially cut-away view of a microbolometer detector element according to the present invention.

Turning now to FIG. 2, a perspective view of the microbolometer 10 is illustrated. As can be seen, the planar member 26 of the thermally isolating structure 20 preferably includes a serpentine-like configuration meandering between the leg members 28 and 18. In this way, the planar member 26 also serves as a reflective layer for returning optical radiation not absorbed by the absorptive structure 12 back to the absorptive structure 12 to enhance its responsivity.

Figure 3A:
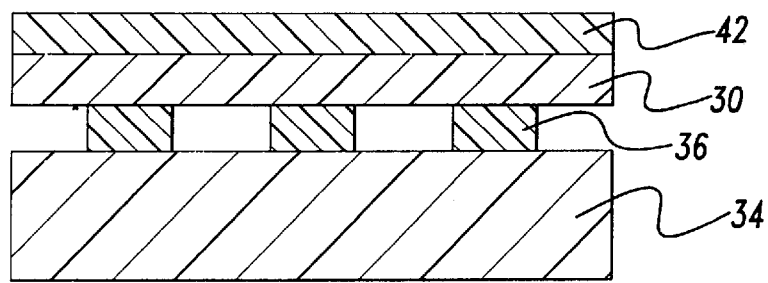
FIGS. 3a–3f are sectional views illustrating successive steps in the fabrication of the microbolometer detector element of FIGS. 1 and 2.

FIGS. 3a–3f illustrate successive fabrication steps for the microbolometer element of the present invention. The microbolometer 10 is preferably fabricated on an industry-standard silicon dioxide dielectric layer 30 using standard silicon processing techniques (photolithography, etching, etc.). In FIG. 3a, the readout circuitry 34 is fabricated onto the silicon dielectric layer 30. The readout circuitry 34 may include transistors, diodes, busslines, and interconnecting metalizations, and may be of conventional design. In the next step, a first sacrificial layer 42 of soluble material, preferably polyimide, is deposited on the dielectric layer 30.

Figure 3B:
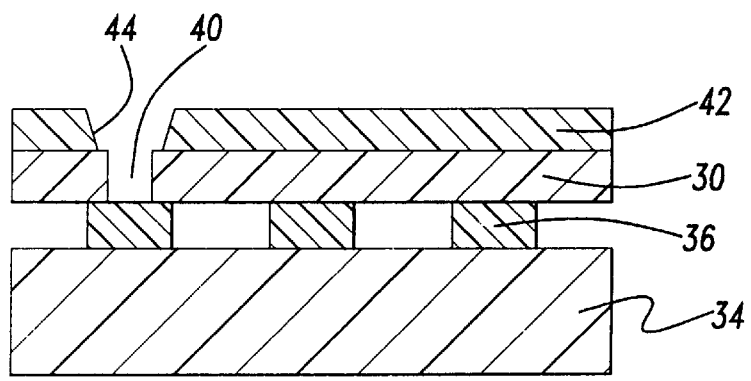
Figure 3C:
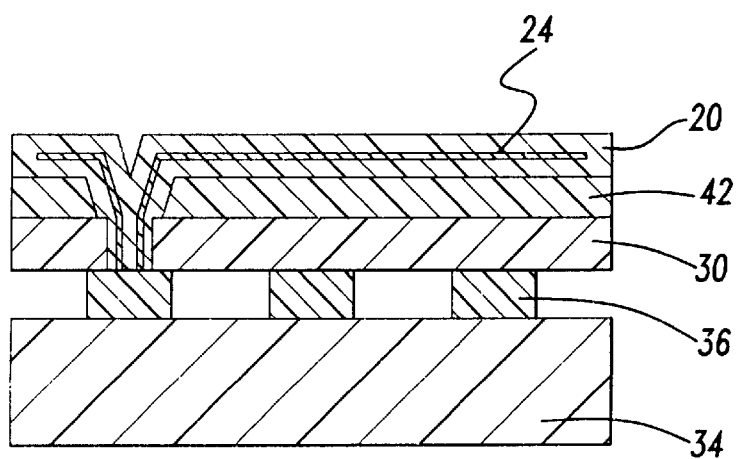

Next, as illustrated in FIG. 3b, the first via 40 and a second via 44 are cut into the dielectric layer 30 and the first sacrificial layer 42 respectively. The second via 44 has sloped edges which will define the sloped sides of the eventual leg members 28 of the thermally isolating structure 20.

In the next step, the silicon nitride and conductive strip 24 of the thermally isolating structure 20 are deposited onto the first sacrificial layer 42 and into the first and second vias 40 and 44. This is preferably accomplished by depositing a thin layer of silicon nitride followed by depositing the metal (and ensuring its contact with the metal pads 36) followed by depositing a second thin layer of silicon nitride. In this way, the conductive strip 24 is embedded within the silicon nitride while its electrical contact with the readout circuitry 34 is ensured.

Figure 3D:
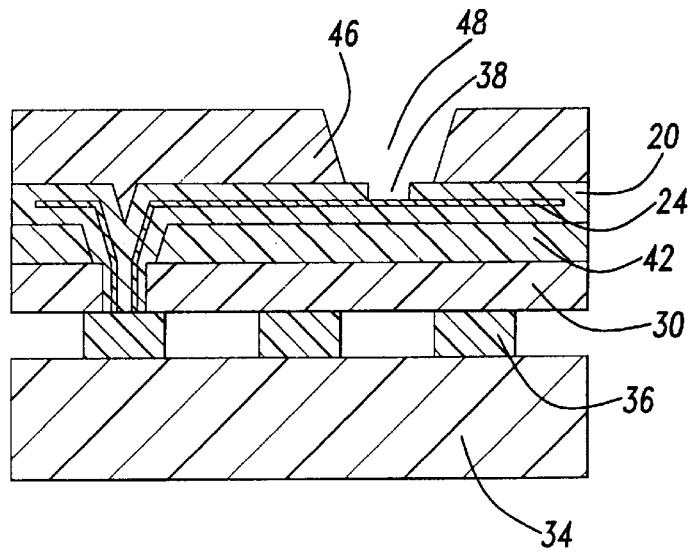

Next, as illustrated in FIG. 3*d*, a second sacrificial layer 46 of soluble material is deposited on the thermally isolating structure 20. The second sacrificial layer 46 is preferably silicon dioxide, polysilicon, or polyimide. Thereafter, the recess 38 and a third via 48 are cut into the thermally isolating structure 20 and second sacrificial layer 46 respectively. The third via 48 has sloped sides which will define the sloped edges of the leg members 18 of the eventual absorptive structure 12.

Figure 3E:
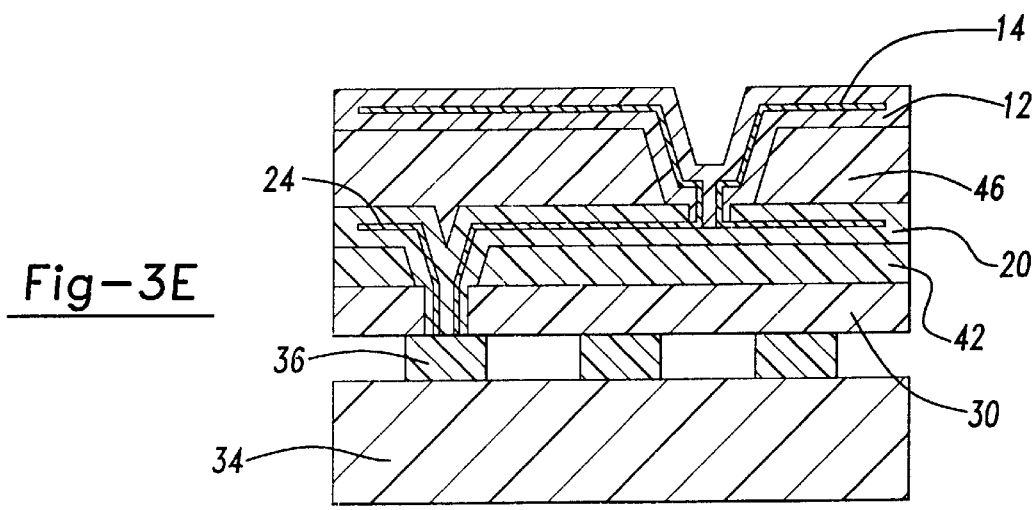

As illustrated in FIG. 3*e*, the next step is to deposit the silicon nitride and semiconductive strip 14 onto the second sacrificial layer 46 and into the third via 48 and recess 38. This is preferably accomplished by depositing a thin layer of silicon nitride followed by vanadium oxide, preferably using ion beam sputtering. The vanadium oxide layer is deposited so that its connecting portions are in electrical contact with the conductive strip 24. Thereafter, a second thin layer of silicon nitride is deposited over the vanadium oxide layer.

Figure 3F:
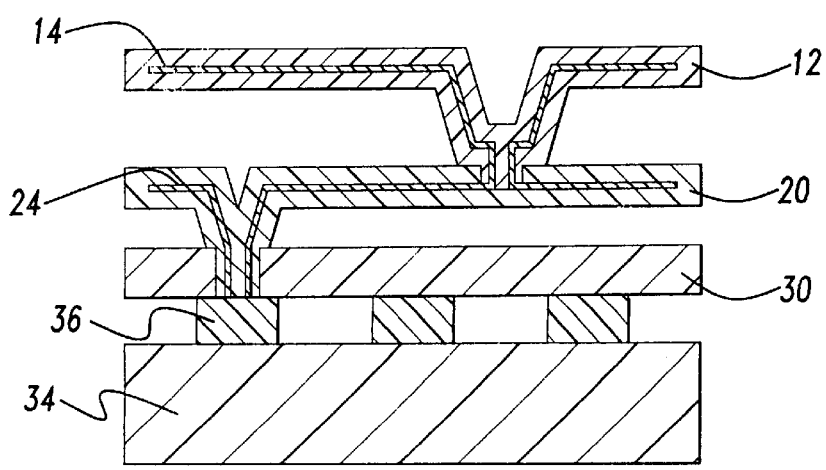

In the final step, as illustrated in FIG. 3*f*, the first and second sacrificial layers 42 and 46 are removed by dry plasma processing or wet etching that selectively removes the sacrificial layers 42 and 46, leaving behind the microbolometer structure of FIG. 1. If foss-glass is used as the sacrificial layers 42 and 46, a diluted, buffered hydrofluoric acid solution is the preferred etchant.

As described above, it is highly desirable to keep the planar surface 16 of the absorptive structure 12 substantially thermally insulated from the dielectric layer 30 and readout circuitry 34. To accomplish this, the leg members 28 of the thermally isolating structure 20 are preferably made very thin, narrow, and long relative to the planar surface 16. Advantageously, the characteristic dimensions of the planar surface 16 can be controlled independently of the characteristic dimensions of the thermally isolating structure 20.

Figure 4A:
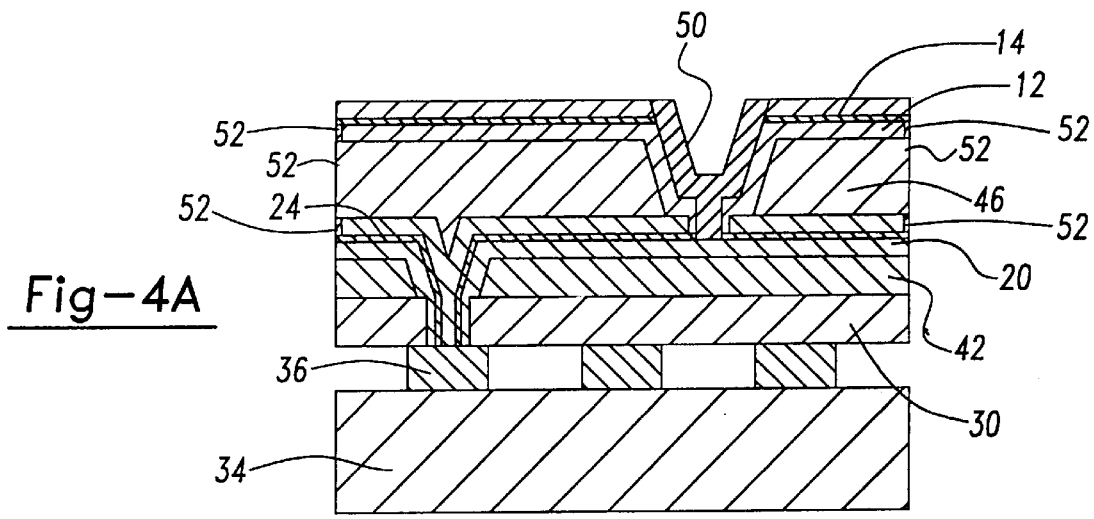
FIGS. 4a–4c are sectional views illustrating an alternate method of fabricating the microbolometer detector element of the present invention.
Figure 4B:
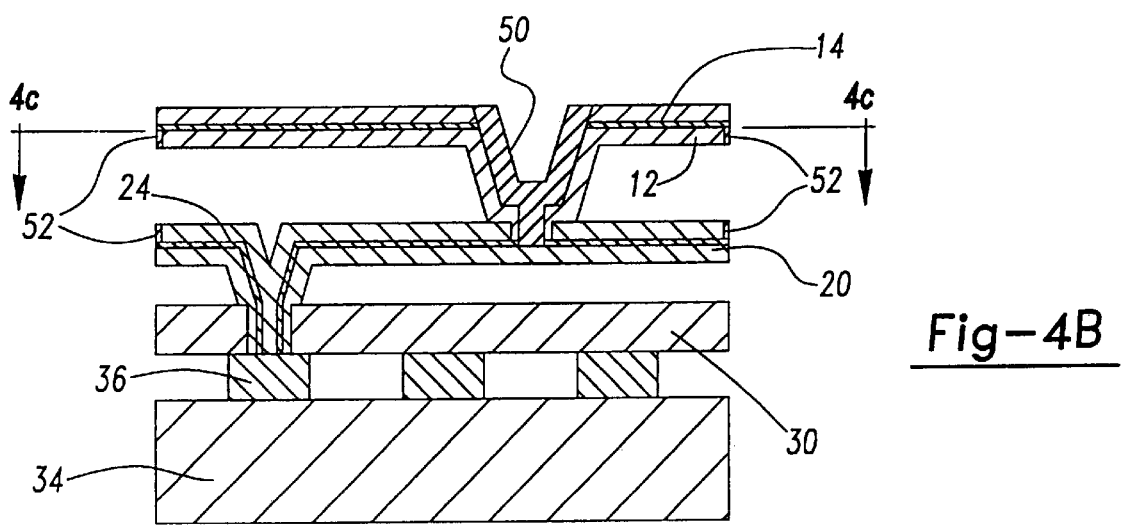
Figure 4C:
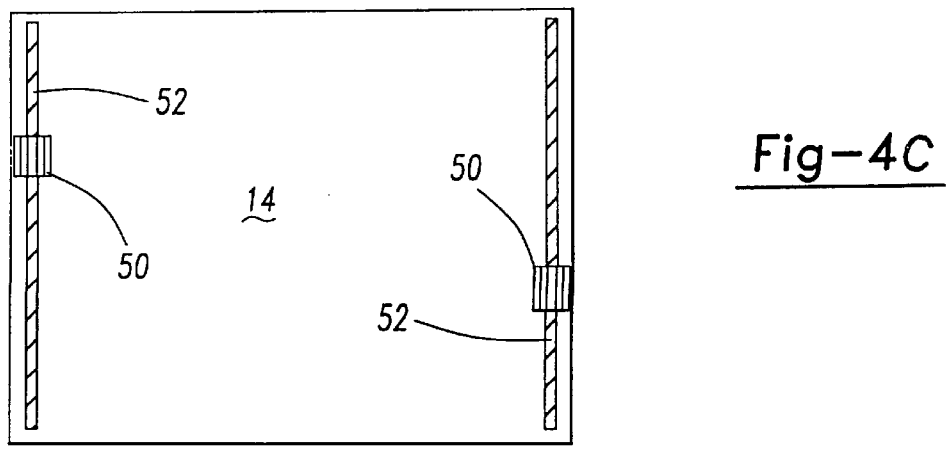

Referring momentarily to FIGS. 4A through 4C, in order to ensure solid electrical contact between the semiconductive strip 14 and the conductive strip 24, it may be advantageous to deposit a metal plug 50 into the third via and recess 38 or to add an edge contact 52 about the perimeter of the semiconductive strip 14 and conductive strip 24 or to do both. It is presently preferred to include the edge contact 52 to provide uniform current throughout the entire area of the absorptive structure 12. If either the plug 50 or edge contact 52 are desired, they would be deposited during the process described above with respect to FIG. 3E.

According to the present invention, the optical fill factor for each pixel can be brought up from about 65% to greater than 90% for a fifty (50) micron pixel. The fill factor for a thirty (30) micron pixel can be increased from 45% up to greater than 85%. The isolation support legs can be made several times longer than according to previous designs. Increasing the leg length increases the thermal isolation of the active area which leads to a commensurate increase in pixel responsivity. Furthermore, the silicon nitride that provides the leg structure support can have its thickness tailored separately from the active absorbing area. This enables one to further increase the thermal isolation of the pixels without decreasing the absorptivity of the active area.

Advantageously, the isolation legs can be fabricated in a meander pattern to serve as a reflector layer for the elevated optical cavity. The present invention is particularly well suited for uncooled staring arrays having large formats such as 480×640 formats and small pixels.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An uncooled microbolometer detector element for a focal plane array, said microbolometer comprising:
    an optically absorptive material structure characterized by an absorptive material having an electrical resistivity that varies as a function of its temperature;
    a thermal isolation structure coupled in spaced relation to said optically absorptive material structure for thermally isolating said absorptive material;
    a sensor coupled in spaced relation to said thermal isolation structure and communicating with said optically absorptive material structure to sense a resistivity of said optically absorptive material structure;
    said optically absorptive material structure including a planar member coupled to a first set of downwardly projecting leg members, said first set of leg members being coupled to said thermal isolation structure for supporting said planar member in spaced relation above said thermal isolation structure;
    said thermal isolation structure including a planar surface coupled to a second set of downwardly projecting leg members, said second set of leg members being coupled to said sensor for supporting said planar surface in spaced relation above said sensor such that said thermal isolation structure is disposed between said optically absorptive material structure and said sensor; and
    said planar surface of thermal isolation structure having a serpentine configuration meandering from a first end to a second end.

2. The microbolometer of claim 1 wherein said first end terminates in a first of said leg members and said second end terminates in a second of said leg members.

3. The microbolometer of claim 1 wherein said planar surface further comprises a reflective layer for reflecting optical radiation not absorbed by said absorptive material back to said absorptive material.

4. The microbolometer of claim 1 wherein said thermal isolation structure further comprises a conductive layer and silicon nitride.

5. The microbolometer of claim 1 wherein said thermal isolation structure electrically interconnects said sensor and said optically absorptive material structure.

6. The microbolometer of claim 1 wherein said optically absorptive material structure further comprises a semiconductive layer and silicon nitride.

7. The microbolometer of claim 1 wherein said sensor further comprises an integrated circuit having a dielectric layer deposited thereon.

8. The microbolometer of claim 7 wherein said dielectric layer includes at least one via formed therein for providing electrical access to said integrated circuit.

9. The microbolometer of claim 7 wherein said dielectric layer further comprises silicon dioxide.

10. An uncooled microbolometer detector element for a focal plane array, said microbolometer comprising:

integrated readout circuitry;

a dielectric layer on said readout circuitry, said dielectric layer including a via for providing electrical access to said readout circuitry;

a thermally isolating bridge structure having a planar surface extending between downwardly projecting legs, said downwardly projecting legs being coupled to said dielectric layer for supporting said planar surface in spaced relation to said dielectric layer so as to form a thermal cavity therebetween;

an optically absorptive material layer including a planar member extending between downwardly projecting legs, said downwardly projecting legs being coupled to said thermally isolating bridge structure so as to form an optical cavity therebetween, said optically absorptive material layer being characterized by an electrical resistivity that varies as a function of its temperature, said readout circuitry being connected to said optically absorptive material layer to sense its electrical resistivity; and said planar surface of thermally isolating bridge structure having a serpentine configuration meandering between said downwardly projecting legs.

11. The microbolometer of claim 10 wherein said planar surface of said thermally isolating bridge structure further comprises a reflective layer for reflecting optical radiation not absorbed by said optically absorptive material layer back to said optically absorptive material layer.

12. The microbolometer of claim 10 wherein said thermally isolating bridge structure further comprises a conductive layer embedded in silicon nitride.

13. The microbolometer of claim 10 wherein said optically absorptive material layer further comprises a semiconductive layer embedded in silicon nitride.

14. The microbolometer of claim 10 wherein said dielectric layer further comprises silicon dioxide.

15. A method of producing an uncooled microbolometer detector element for a focal plane array, said method comprising:

providing integrated readout circuitry having a dielectric layer deposited thereon, said dielectric layer including first vias for providing electrical access to said readout circuitry;

depositing a first sacrificial layer having a preselected thickness on said dielectric layer, said first sacrificial layer including second vias adjacent said first vias for providing electrical access to said readout circuitry;

depositing a thermal isolation layer on said first sacrificial layer, said thermal isolation layer including a conductive layer electrically coupled to said readout circuitry through said first and second vias, said thermal isolation layer further including recesses for providing electrical access to said conductive layer, wherein said step of depositing said thermal isolation layer includes forming leg members in said first and second vias and forming a serpentine-like planar surface meandering between said leg members on a surface of said first sacrificial layer;

depositing a second sacrificial layer having a predetermined thickness on said thermal isolation layer, said second sacrificial layer including third vias adjacent said recesses for providing electrical access to said conductive layer;

depositing an optically absorptive material layer on said second sacrificial layer, said optically absorptive material layer including a semiconductive layer electrically coupled to said conductive layer through said third vias and said recesses; and removing said first and second sacrificial layers to form a thermal cavity between said dielectric layer and said thermal isolation layer and an optical cavity between said thermal isolation layer and said optically absorptive material layer.

16. The method of claim 15 wherein said step of depositing said optically absorptive material layer further comprises forming leg members in said third vias and said recesses and forming a planar member extending between said leg members on a surface of said second sacrificial layer.

17. The method of claim 15 wherein said step of depositing said thermal isolation layer further comprises:

depositing a first layer of silicon nitride on said first sacrificial layer;

depositing said conductive layer on said first layer of silicon nitride; and depositing a second layer of silicon nitride on said conductive layer.

18. The method of claim 15 wherein said step of depositing said absorptive layer further comprises:

depositing a first layer of silicon nitride on said second sacrificial layer;

depositing said semiconductive layer on said first layer of silicon nitride; and depositing a second layer of silicon nitride on said semiconductive layer.

19. The method of claim 18 wherein said semiconductive layer further comprises vanadium oxide.

* * * * *